(12) United States Patent
Boeke

(10) Patent No.: US 8,610,373 B2
(45) Date of Patent: Dec. 17, 2013

(54) DIMMING OF LIGHTING SYSTEM

(75) Inventor: Ulrich Boeke, Langerwehe (DE)

(73) Assignee: Koninklijke Philips N.V., Eindhoven (NL)

( * ) Notice: Subject to any disclaimer, the term of this patent is extended or adjusted under 35 U.S.C. 154(b) by 168 days.

(21) Appl. No.: 13/386,047

(22) PCT Filed: Jul. 19, 2010

(86) PCT No.: PCT/IB2010/053273
§ 371 (c)(1),
(2), (4) Date: Jan. 20, 2012

(87) PCT Pub. No.: WO2011/010272
PCT Pub. Date: Jan. 27, 2011

(65) Prior Publication Data
US 2012/0194081 A1    Aug. 2, 2012

(30) Foreign Application Priority Data
Jul. 21, 2009   (EP) ...................................... 09165940

(51) Int. Cl.
*H05B 37/02*   (2006.01)
(52) U.S. Cl.
USPC ............................. 315/291; 315/151; 315/297
(58) Field of Classification Search
USPC .......... 315/149–151, 291, 294, 297, 307–308
See application file for complete search history.

(56) References Cited

U.S. PATENT DOCUMENTS

| | | | |
|---|---|---|---|
| 4,135,116 A | 1/1979 | Smith | |
| 5,742,131 A | 4/1998 | Sprout et al. | |
| 2004/0124338 A1 | 7/2004 | Cloutier et al. | |
| 2005/0168154 A1 | 8/2005 | Erickson et al. | |
| 2006/0202641 A1 | 9/2006 | Buij et al. | |
| 2009/0015175 A1 | 1/2009 | Chiang | |
| 2010/0176733 A1* | 7/2010 | King | 315/158 |
| 2010/0321418 A1* | 12/2010 | Hayashi | 345/690 |

FOREIGN PATENT DOCUMENTS

WO   2008000086 A1   1/2008

* cited by examiner

*Primary Examiner* — Jason M Crawford
(74) *Attorney, Agent, or Firm* — Mark L. Beloborodov

(57) ABSTRACT

A lighting system comprises a plurality of lighting units (1, 4) each configured to light a target area. A central dimming element having an adjustable conductance is provided. Each lighting unit comprises at least one light source (101, 201), a controllable light source driver (2, 5) coupled to the light source (101, 201), and a light sensor (3, 6) configured to measure a light flux in the target area of the lighting unit (1, 4). The light source driver supplies power to the light source in accordance with an input control voltage generated by a current source. The light sensor is coupled to the current source, and has a variable conductance corresponding to the light flux. The lighting units (1, 4) can be dimmed in combination by coupling each light sensor (3, 6) in parallel to the dimming element (7) through a respective diode (9, 10, 13).

5 Claims, 1 Drawing Sheet

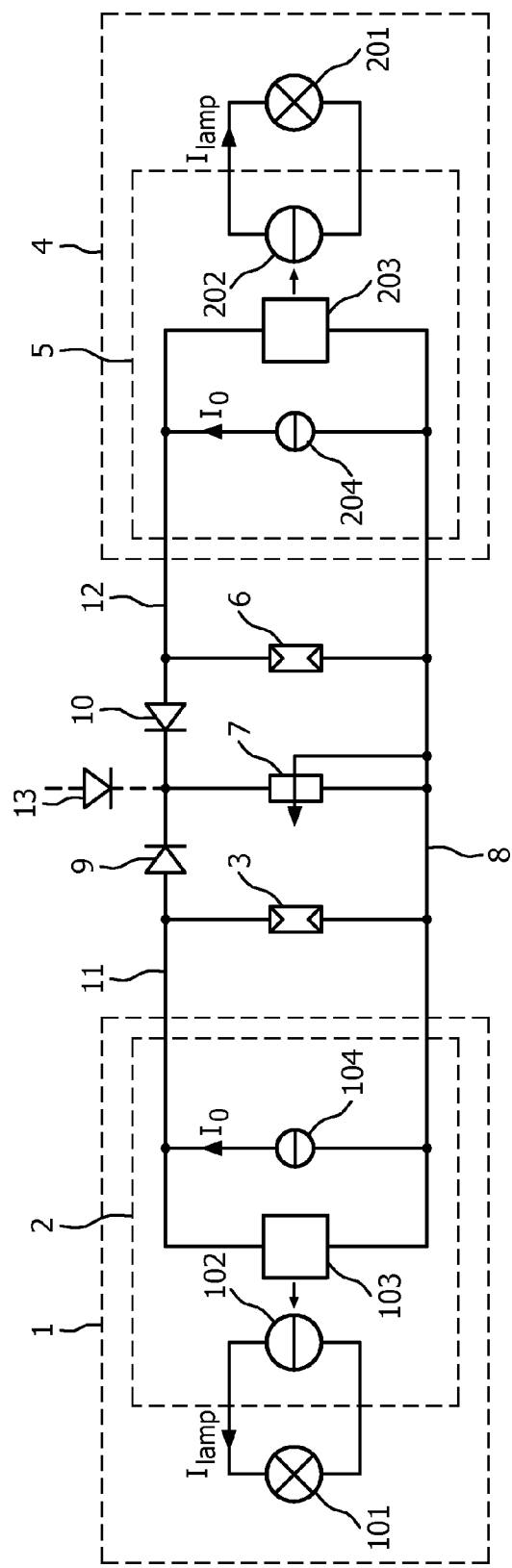

DIMMING OF LIGHTING SYSTEM

FIELD OF THE INVENTION

The invention relates to the field of lighting systems, and more specifically to dimming of a lighting system comprising a plurality of lighting units.

BACKGROUND OF THE INVENTION

Lighting systems, e.g. lighting systems for office use where large areas need to be lit up to a rated light flux level, usually comprise a plurality of lighting units (or luminaires, or groups of luminaires), each being configured to light a target area. In combination, the lighting units provide an adequate lighting of the total space.

In view of saving energy, the lighting units may comprise a light sensor (also referred to as a daylight sensor) which takes into account a contribution of daylight to the light flux level in the target area of the lighting unit in addition to the artificial light flux generated by the lighting unit itself. The light sensor, which contains a photoconductive cell, is configured to measure the light flux in the target area of the lighting unit. If the target area of the lighting unit has a sufficient light flux level generated by natural light entering the target area, then the corresponding lighting unit will be controlled through the light sensor to produce no, or a low level of (artificial) light flux in the target area of the lighting unit. Other lighting units in whose target area only a limited natural light flux, or no natural light flux at all enters, will be controlled through their corresponding light sensor to produce a high level of artificial light flux. Accordingly, whether a high natural light flux or a low natural light flux is present in the different target areas, all target areas may be lit at the same light flux level by adding an appropriate artificial light flux.

If the light flux level in a target area of a lighting unit, when using a light sensor, is found to be higher than required, or higher than desired, it should be possible to (manually or automatically) dim the lighting unit. This applies in particular when the natural light flux is relatively low, e.g. in a dark section of a building area, in periods of dark weather, or at nighttime. Dimming of lighting units may be done by adding a manually or automatically operated dimming element to each lighting unit, the dimming element overriding the light sensor. Also, digital control systems may be used providing manual or automatic dimming of one or more lighting units.

Disadvantages of the known dimming arrangements in use are the required number of components, the complexity of the lighting system, the associated costs including installation costs, difficulties in commissioning of the lighting system, etc.

SUMMARY OF THE INVENTION

It would be desirable to provide a lighting system providing a low-cost, simple and effective dimming arrangement.

To better address one or more of the above concerns, in a first aspect of the invention a lighting system is provided comprising a plurality of lighting units each configured to light a target area, and a dimming element. Each lighting unit comprises: at least one light source; a controllable light source driver coupled to the light source, the light source driver configured to supply power to the light source in accordance with an input control voltage generated by a current source; and a light sensor configured to measure a light flux in the target area of the lighting unit, the light sensor being coupled to said current source, and having a variable conductance corresponding to the light flux. In particular, the conductance of the light sensor decreases when the incident light on the light sensor decreases, and vice versa. The dimming element has an adjustable conductance. Each light sensor is coupled in parallel to the dimming element through a respective diode. In particular, the anode of the diode is directed to the light sensor. Further, the cathode of the diode is directed to the dimming element.

In the lighting system according to the invention, the lighting units coupled to the dimming element (which can be considered to be a central dimming element) and having target areas which receive a low natural light flux (and consequently would receive a high artificial light flux from the associated light source(s)), may be dimmed by the dimming element which, in an embodiment, is a variable resistor or a potentiometer. This provides for a selectable central dimming to a certain maximum artificial light flux level for all lighting units coupled to the dimming element. The actual artificial light flux level of a lighting unit may be lower than this maximum artificial light flux level set by the dimming element, if the light sensor associated with the lighting unit would detect a sufficient natural light flux.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWING

FIG. 1 depicts a circuit diagram of an embodiment of a lighting system according to the present invention.

DETAILED DESCRIPTION OF EMBODIMENTS

FIG. 1 depicts a lighting system comprising a first lighting unit 1 and a second lighting unit 4. The first lighting unit 1 comprises a first light source 101 and a controllable first light source driver 2. The first light source driver 2 comprises a first driver current source 102 coupled to the first light source 101 for supplying a current $I_{lamp}$ to the first light source 101. A first voltage measuring circuit 103 is coupled (in parallel) to a parallel arrangement of a first measuring current source 104, generating a DC current $I_o$, and a first light sensor 3 comprising a photoconductive cell.

Likewise, a second lighting unit 4 comprises a second light source 201 and a controllable second light source driver 5. The second light source driver 5 comprises a second driver current source 202 coupled to the second light source 201 for supplying a current $I_{lamp}$ to the second light source 201. A second voltage measuring circuit 203 is coupled (in parallel) to a parallel arrangement of a second measuring current source 204, generating a DC current $I_o$, and a second light sensor 6 comprising a photoconductive cell.

The photoconductive cells of the first light sensor 3 and the second light sensor 6 each have a variable resistance depending on the amount of light incident on them. When the amount of incident light on the photoconductive cell is high, its resistance is low (in other words, its conductance is high), whereas when the amount of incident light on the photoconductive cell is low, its resistance is high (in other words, its conductance is low). Each of the light sensors 3, 6 measure an amount of light in a target area, or a representative part thereof, of the corresponding lighting unit 1, 4, respectively. Here, the target area is defined as an area destined to receive light generated by the lighting unit.

Each of the first light source 101 and the second light source 201 may comprise any of one or more incandescent lamps, gas discharge lamps, light emitting diodes (LEDs), LED lamps, or other types of lamps.

The first voltage measuring circuit 103 controls the first driver current source 102, and the second voltage measuring circuit 203 controls the second driver current source 202, as symbolized by an arrow between the respective elements. With increasing voltages measured by the first and/or second measuring circuit 103, 203, increasing currents $I_{lamp}$ are generated by the first and/or second driver current source 102, 202, respectively. Conversely, with decreasing voltages measured by the first and/or second measuring circuit 103, 203, decreasing currents $I_{lamp}$ are generated by the first and/or second driver current source 102, 202, respectively. With increasing lamp currents $I_{lamp}$, a higher artificial light flux is generated by the respective first and second light sources 101, 201.

The first light sensor 3 is coupled in parallel to a dimming element, in the embodiment shown a potentiometer (or variable resistor) 7 through a diode 9. The second light sensor 6 is coupled in parallel to the potentiometer 7 through a diode 10. As indicated by diode 13 comprised in a dashed line, further lighting units (having a similar basic circuit arrangement as the lighting units 1 and 4) having further light sensors may be coupled in parallel to the potentiometer 7 through a diode. The anodes of the first diode 9, the second diode 10, and possible further diodes 13 are directed to the respective first light sensor 3, second light sensor 6, and possible further light sensors, respectively, and the cathodes of the first diode 9, the second diode 10, and possible further diodes 13 are directed to the potentiometer 7.

The operation of the lighting system comprising the lighting units 1 and 4 is as follows.

For the first measuring current source 104, the first light sensor 3 is coupled in parallel with a series arrangement of the first diode 9 and the potentiometer 7. When the first diode 9 is backward biased, the current $I_o$ generated by the first measuring current source 104 flows through the first light sensor 3, of which the resistance/conductance determines the voltage across the first measuring current source 104, and thus the voltage across the first voltage measuring circuit 103. When the first diode 9 is forward biased, the current $I_o$ generated by the first measuring current source 104 partly flows through the first light sensor 3, and partly through the diode 9 and the potentiometer 7, where basically the resistance/conductance of the parallel arrangement of the first light sensor 3 and the potentiometer 7 determines the voltage across the first measuring current source 104, and thus the voltage across the first voltage measuring circuit 103. The first voltage measuring circuit 103 controls the current $I_{lamp}$ output by the first driver current source 102 on the basis of the voltage across the first voltage measuring circuit 103 (or the voltage across the first measuring current source 104), such that when the measured voltage is high, the current $I_{lamp}$ to the first light source 101 is high, and when the measured voltage is low, the current $I_{lamp}$ to the first light source 101 is low.

For the second measuring current source 204, the second light sensor 6 is coupled in parallel with a series arrangement of the second diode 10 and the potentiometer 7. When the second diode 10 is backward biased, the current $I_o$ generated by the second measuring current source 204 flows through the second light sensor 6, of which the resistance/conductance determines the voltage across the second measuring current source 204. When the second diode 10 is forward biased, the current $I_o$ generated by the second measuring current source 204 partly flows through the second light sensor 6, and partly through the diode 10 and the potentiometer 7, where basically the resistance/conductance of the parallel arrangement of the second light sensor 6 and the potentiometer 7 determines the voltage across the second measuring current source 204. The second voltage measuring circuit 203 controls the current $I_{lamp}$ output by the second driver current source 202 on the basis of the voltage across the second voltage measuring circuit 203 (or the voltage across the second measuring current source 204), such that when the measured voltage is high, the current $I_{lamp}$ to the second light source 201 is high, and when the measured voltage is low, the current $I_{lamp}$ to the second light source 201 is low.

For illustration purposes, first a lighting situation during daytime is analyzed.

It is assumed that the first lighting unit 1 is positioned close to a window of a room, and consequently in daytime the target area of the first lighting unit 1 receives a large natural light flux, which is detected by the first light sensor 3. As a result, the resistance of the photoconductive cell of the first light sensor 3 is relatively low (i.e. the conductance of the photoconductive cell of the first light sensor 3 is relatively high), and the first measuring current source 104 of first light source driver 2 generates a low control voltage on line 11 that is monitored in first light source driver 2 by the first voltage measuring circuit 103. This low control voltage forces the first light source driver 2 to operate the first light source 101 in the first lighting unit 1 with a low power level. Accordingly, the natural light flux combined with the artificial light flux generated by the first lighting unit 1 establishes a predetermined light flux in the target area of the first lighting unit 1.

Further, it is assumed that the second lighting unit 4 is positioned at a large distance to any window of the room, and consequently in daytime the target area of the second lighting unit receives substantially no, or just a limited natural light flux, which is detected by the second light sensor 6. As a result, the resistance of the photoconductive cell of second light sensor 6 is relatively high (i.e. the conductance of the photoconductive cell of the second light sensor 6 is relatively low), and the second measuring current source 204 of the second light source driver 5 generates a high voltage on line 12 that is monitored in second light source driver 5 by the second voltage measuring circuit 203. This high control voltage forces the second light source driver 5 to operate the second light source 201 in the second lighting unit 4 with a high power level.

The high control voltage on line 12 compared with line 11 forward biases (turns on) second diode 10, and backward biases (turns off) first diode 9. Accordingly, the potentiometer 7 is coupled in parallel to the second light sensor 6, and the current $I_o$ flowing through the combined resistance of the potentiometer 7 and the second light sensor 6 generates a voltage across the second voltage measuring circuit 203 which can be varied by varying (adjusting) the resistance (conductance) of the potentiometer 7. Thus, the high power level of the second light source driver 5 leading to a high light output of the second lighting unit 4 can be reduced by reducing the resistance (increasing the conductance) of the potentiometer 7. The first light source driver 2 is not influenced by any variation (adjustment) of the resistance of the potentiometer 7 as long as the control voltage on line 12 is higher than the control voltage on line 11, and as long as the power level of the first light source driver 2 is lower than the power level of the second light source driver 5 due to the control voltage on line 11 resulting from first light sensor 3.

As indicated above, one or more further lighting units (having a similar basic circuit arrangement as the lighting units 1 and 4) having further light sensors may be coupled in parallel to the potentiometer 7 through a diode 13. If it is assumed that such further lighting units, like lighting unit 4, are positioned at a large distance to any window of the room, and consequently in daytime their target area receives substantially no, or just a limited natural light flux, which is detected by a corresponding light sensor, then the light flux generated by both the lighting unit 4 and such further lighting units may be adjusted by the (one) potentiometer 7, which thus provides a central dimming arrangement.

Second, a lighting situation in which substantially no natural light is present, e.g. during dark weather or during nighttime, is analyzed.

In case of absence of a natural light flux, all light sensors 3, 6 in the lighting system have a high resistance (low conductance). Accordingly, the first and second measuring current sources 104, 204 generate a high control voltage on lines 11, 12 which forward biases the first and second diodes 9, 10, respectively. A single control voltage is generated across the potentiometer 7 which centrally controls the artificial light flux generated by all lighting units 1, 4. If the resistance of the potentiometer 7 is high (or its conductance is low), then the voltage across the first and second voltage measuring circuits 103, 203 is high, leading to a high artificial light flux generated by all lighting units 1, 4 in their target areas. If the resistance of the potentiometer 7 is low (or its conductance is high), then the voltage across the first and second voltage measuring circuits 103, 203 is low, leading to a low artificial light flux generated by all lighting units 1, 4 in their target areas.

Third, a lighting situation during daytime is analyzed, where a target area of a first lighting unit receives a high level of natural light flux, a target area of a second lighting unit receives a medium level of natural light flux, and a target area of a third lighting unit receives a low level of natural light flux.

Assuming that the conductance of the dimming element (potentiometer 7) is low (or its resistance is high), the diodes of the first, second and third lighting units are all backward biased. Thus, the artificial light fluxes generated by the first, second and third lighting units are determined by their light sensors. The first lighting unit will generate a low artificial light flux, the second lighting unit will generate a medium artificial light flux, and the third lighting unit will generate a high artificial light flux.

When the conductance of the dimming element is adjusted to medium (or its resistance is adjusted to medium), then the diode of the third lighting unit becomes forward biased, whereas the diodes of the first and second lighting units remain backward biased. Accordingly, only the third lighting unit is dimmed when the conductance of the dimming element is adjusted to medium.

When the conductance of the dimming element is adjusted to high (or its resistance is adjusted to low), then not only the diode of the third lighting unit, but also the diode of the second lighting unit becomes forward biased, whereas the diode of the first lighting unit remains backward biased. Accordingly, the second and third lighting units are dimmed when the conductance of the dimming element is adjusted to high.

Thus, when the conductance of the central dimming element is adjusted from low to high (or its resistance is adjusted from high to low), the dimming element operates on (i.e. dims) all lighting units having a higher power level (as determined by their light sensor) than a power level corresponding to the adjustment of the dimming element.

From the above analysis it follows that the lighting system according to the present invention provides maximum energy efficiency by reducing the artificial light flux in a lighting unit target area when a natural light flux is available, while for lighting unit target areas where less or no natural light flux is available, a central dimming element (potentiometer, or variable resistor) can be used to centrally control the artificial light flux.

The dimming element may be adjusted manually or automatically (e.g. by an electronic control unit controlling the adjustment in accordance with a value of a predetermined parameter, like time, presence of people, etc.).

As explained in detail above, a lighting system comprises a plurality of lighting units each configured to light a target area. A central dimming element having an adjustable conductance is provided. Each lighting unit comprises at least one light source, a controllable light source driver coupled to the light source, and a light sensor configured to measure a light flux in the target area of the lighting unit. The light source driver supplies power to the light source in accordance with an input control voltage generated by a current source. The light sensor is coupled to the current source, and has a variable conductance corresponding to the light flux. The lighting units can be dimmed in combination by coupling each light sensor in parallel to the dimming element through a respective diode.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage. The term coupled, as used herein, is defined as connected, although not necessarily directly, and not necessarily mechanically.

The invention claimed is:

1. A lighting system comprising:
   a plurality of lighting units each configured to light a target area, each lighting unit comprising:
   at least one light source;
   a controllable light source driver coupled to the light source; the light source driver configured to supply power to the light source in accordance with an input control voltage generated by a current source; and
   a light sensor configured to measure a light flux in the target area of the lighting unit, the light sensor being coupled to said current source, and having a variable conductance corresponding to the light flux,
   a dimming element having an adjustable conductance, wherein each light sensor is coupled in parallel to the dimming element through a respective diode.

2. The lighting system of claim 1, wherein the conductance of the light sensor decreases when the incident light on the light sensor decreases, and vice versa.

3. The lighting system of claim 1, wherein the anode of the diode is directed to the light sensor.

4. The lighting system of claim 1, wherein the cathode of the diode is directed to the dimming element.

5. The lighting system of claim 1, wherein the dimming element is a variable resistor or a potentiometer.

\* \* \* \* \*